C. B. STILWELL.
MACHINE FOR IMPRESSING CHARACTERS ON SHEET MATERIAL.
APPLICATION FILED SEPT. 24, 1908.

931,158.

Patented Aug. 17, 1909.
4 SHEETS—SHEET 1.

WITNESSES:

INVENTOR
Charles B. Stilwell
BY
Chas. N. Butler
ATTORNEY.

C. B. STILWELL.
MACHINE FOR IMPRESSING CHARACTERS ON SHEET MATERIAL.
APPLICATION FILED SEPT. 24, 1908.

931,158. Patented Aug. 17, 1909.
4 SHEETS—SHEET 2.

WITNESSES:
Jos. G. Dennyjr.
Rob R Kitchie

INVENTOR
Charles B. Stilwell
BY
Chas. N. Butler
ATTORNEY.

C. B. STILWELL.
MACHINE FOR IMPRESSING CHARACTERS ON SHEET MATERIAL.
APPLICATION FILED SEPT. 24, 1908.

931,158.

Patented Aug. 17, 1909.
4 SHEETS—SHEET 3.

WITNESSES:

INVENTOR
Charles B. Stilwell
BY
Chas. N. Butler
ATTORNEY.

C. B. STILWELL.
MACHINE FOR IMPRESSING CHARACTERS ON SHEET MATERIAL.
APPLICATION FILED SEPT. 24, 1908.

931,158.

Patented Aug. 17, 1909.
4 SHEETS—SHEET 4.

WITNESSES:

INVENTOR
Charles B. Stilwell
BY
Chas. N. Butler
ATTORNEY.

UNITED STATES PATENT OFFICE.

CHARLES B. STILWELL, OF WAYNE, PENNSYLVANIA, ASSIGNOR, BY MESNE ASSIGNMENTS, TO JOHN T. MORRIS, OF PHILADELPHIA, PENNSYLVANIA.

MACHINE FOR IMPRESSING CHARACTERS ON SHEET MATERIAL.

No. 931,158. Specification of Letters Patent. Patented Aug. 17, 1909.

Application filed September 24, 1908. Serial No. 454,489.

*To all whom it may concern:*

Be it known that I, CHARLES B. STILWELL, a resident of Wayne in the county of Delaware and State of Pennsylvania, have invented a Machine for Impressing Characters on Sheet Material, of which the following is a specification.

My invention is a machine of the nature of a typewriter designed particularly for forming embossed letters upon metal plates suitable for labels, tags and the like. Its structure and mode of operation are also adapted for use in pressing or embossing figures and designs or characters generally, as well as letters, not only upon metal but also upon other materials for various purposes.

The leading features of the invention are found in the means whereby characters are brought readily into position to make their imprints, automatically spaced proportionately to their widths, impressed upon the material with force and precision so as to produce clearly defined and regular effects, and the results of the several operations are automatically presented to view.

The specific characteristics of the structure and operation of my improvements are disclosed in the following description and the accompanying drawings in illustration thereof.

Figure 1:
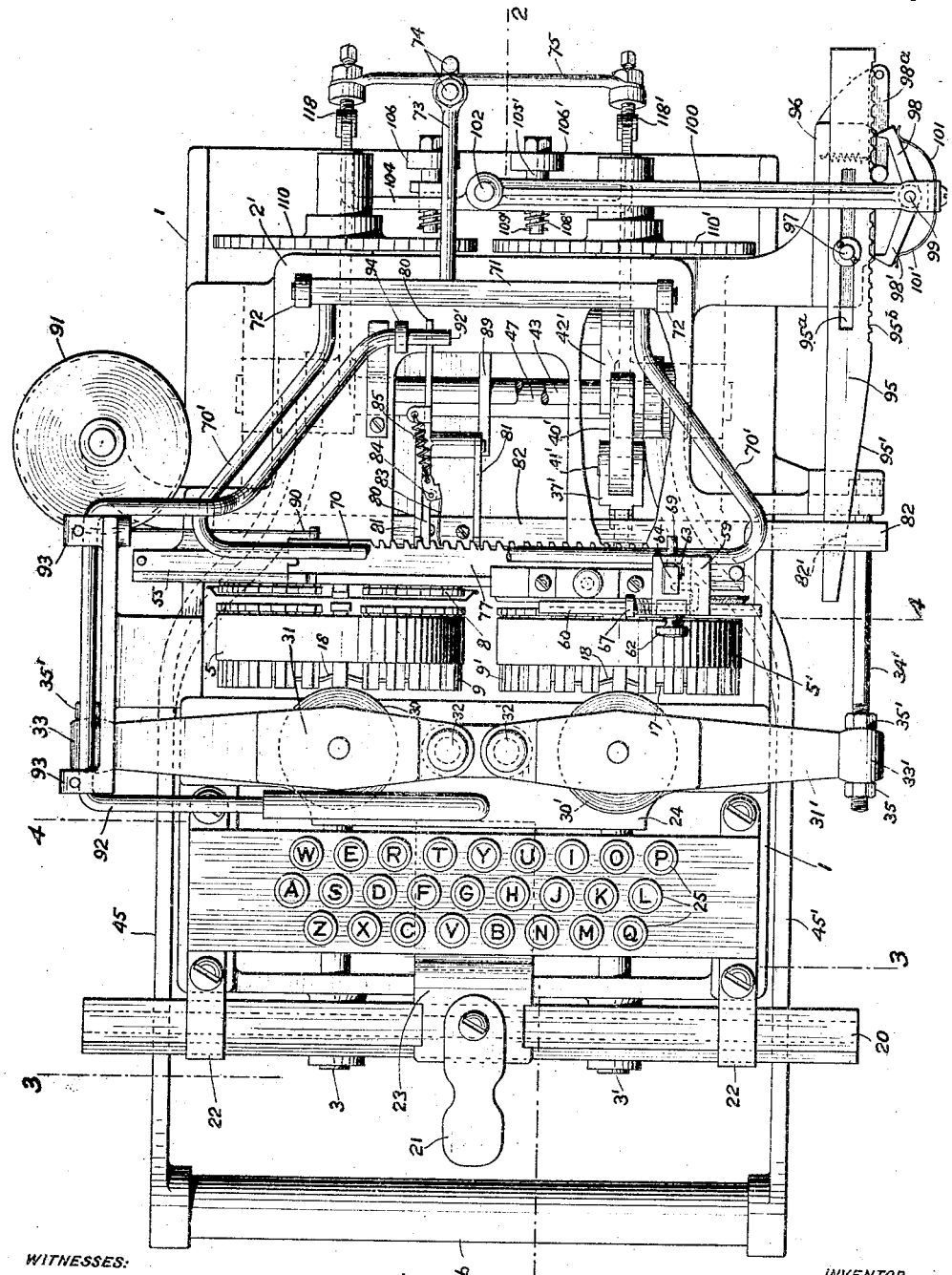
Figure 2:
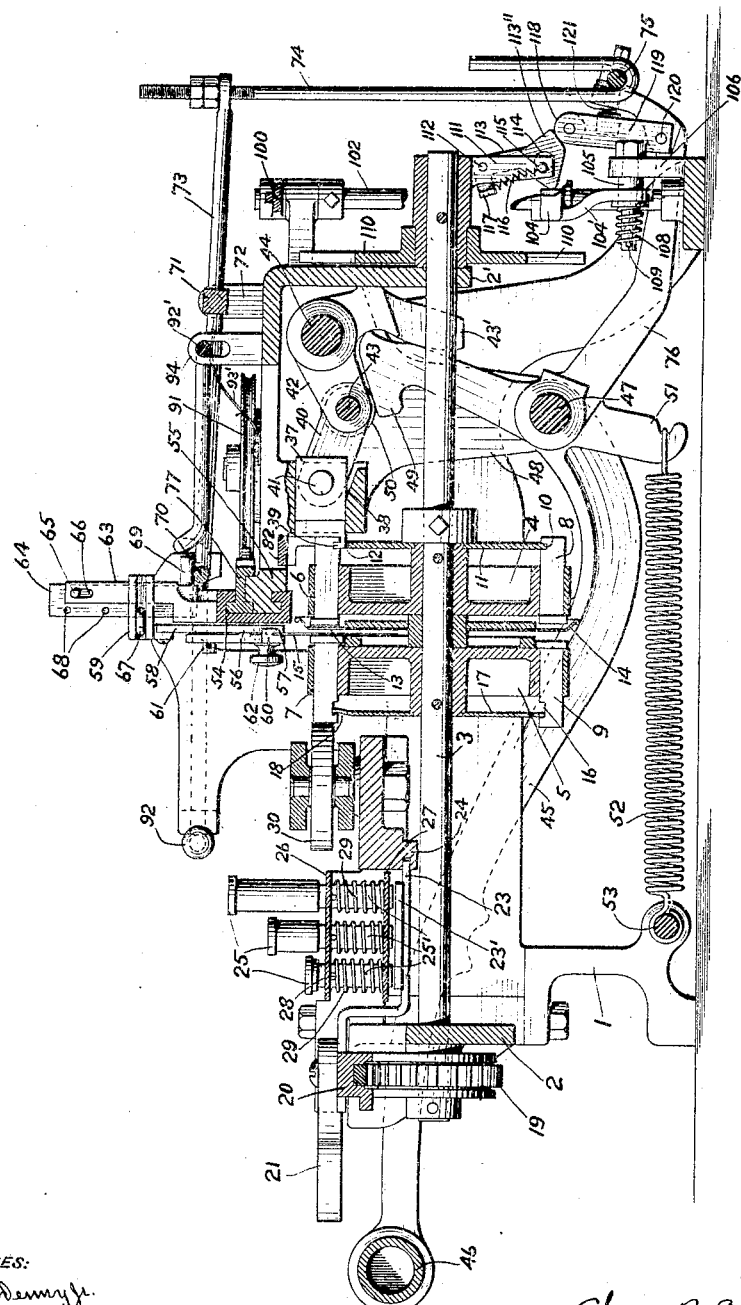
Figure 3:
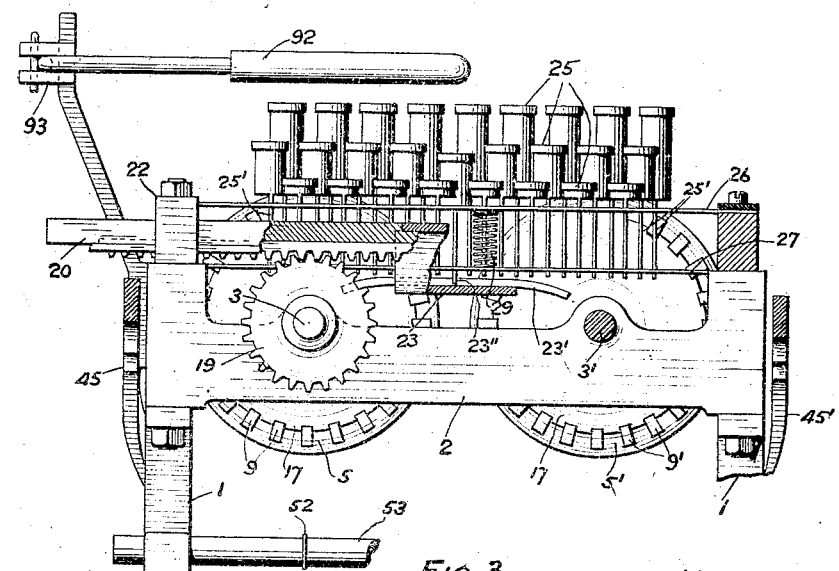
Figure 4:
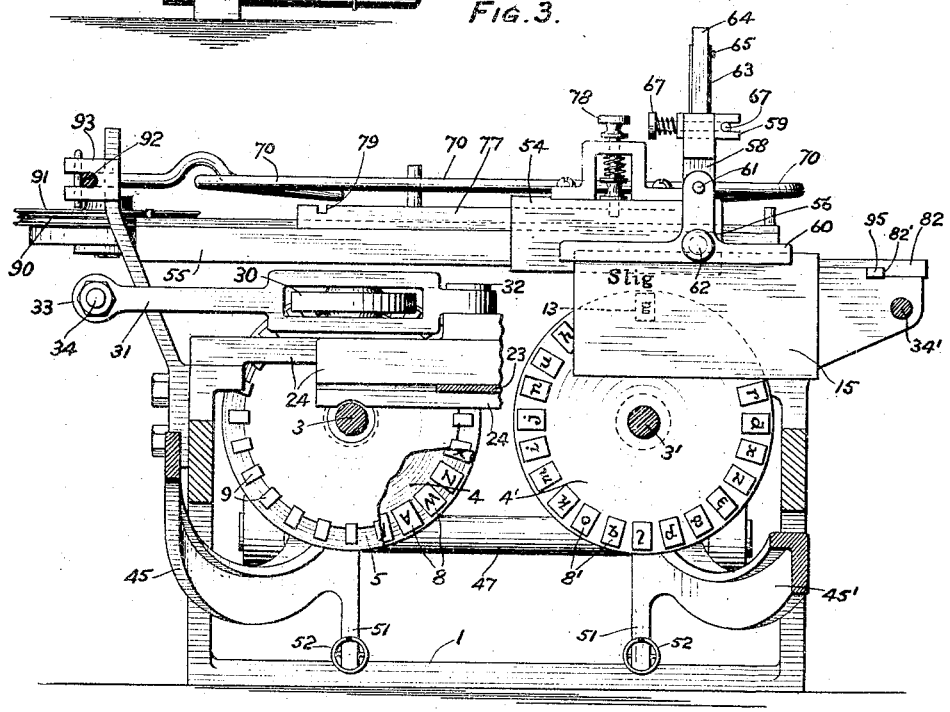
Figure 6:
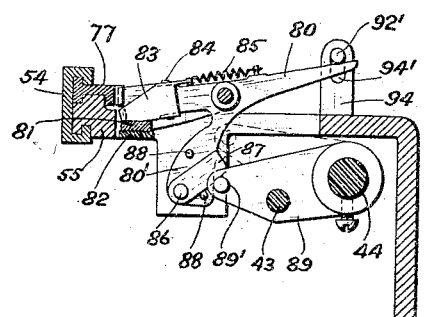
Figure 5:
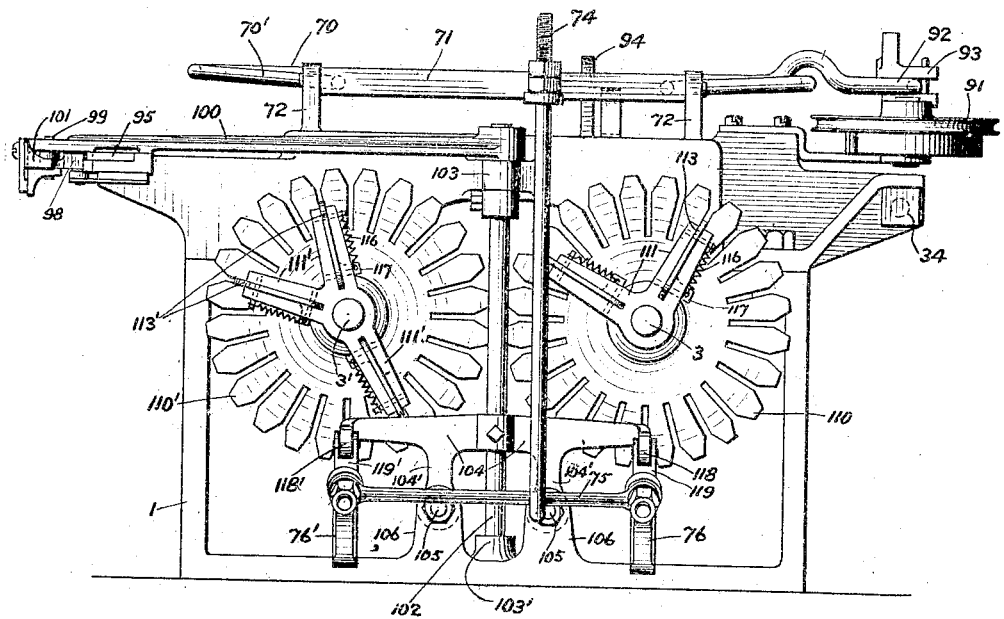

In the accompanying drawings, Figure 1 is a plan view of a machine embodying the invention; Fig. 2 is an irregular sectional view taken on the line 2—2 of Fig. 1; Fig. 3 is an irregular sectional view taken on the line 3—3 of Fig. 1; Fig. 4 is an irregular sectional view taken on the line 4—4 of Fig. 1; Fig. 5 is a rear elevation of the machine; and Fig. 6 is a sectional view showing a side elevation of the main escapement.

The machine illustrated comprises the frame 1 having the housings 2, 2', in which are journaled the parallel shafts 3, 3'. Circular carriers 4, 5, and 4', 5' are fixed on the respective shafts; and, in ways as 6, 7, disposed around the peripheries of the respective carriers, are the type or character bars 8, 9, and 8', 9'; the bars 8 and 8' being provided respectively with the capital and small letters of the alphabet in relievo and the bars 9 and 9' being provided respectively with the capital and small letters in intaglio, arranged so that the corresponding letters in relievo and in intaglio can be moved along the same lines into registration, to the end that a plate disposed between registering letters shall have such letters embossed thereon.

The bars 8, 8', are provided with notches, as 10, which engage the peripheries of stationary disks, as 11, loose on the revolving carriers 4, 4'. These disks 11 hold the bars 8 in their retracted positions as their carriers 4, 4', revolve, and, by means of a notch 12 at the top of each disk, bars in registration therewith are permitted to move forward through an aperture 13 in each of the shields 14 into contact with the work, in the form of a metal plate 15, which is to be embossed. These shields are stationary disks for the protection of the type and are not essential. The bars 9, 9', are provided with notches, as 16, which engage the peripheries of stationary disks, as 17, loose on the revolving carriers 5, 5', such disks holding the bars in their retracted positions during the revolutions of their carriers, and, by means of the irregular or cam portions as 18 at the tops of the disks, the bars, when in their uppermost positions and stationary, have been moved slightly, into contact with the plate 15.

The shafts 3, 3', have fixed on the forward ends thereof pinions, as 19, which are engaged by a rock bar 20 movable, by a handle 21 fixed thereon, in ways 22, whereby the pinions, shafts, carriers and type bars are revolved.

A Z-shaped shoe 23 has one end fixed to the bar 20 and the other end movable in the guide bar or bracket 24 which is supported by the frame. Keys 25, bearing characters as the letters of the alphabet, have shanks 25' which are adapted to move through parallel plates or bars 26 and 27 fixed to the sides of the frame. The key shanks are provided with pins or bosses 28 which make contact with the upper plate 26 and engage springs 29 on the shanks which make contact with the lower plate 27 to elevate the keys. The shoe 23 has secured thereto a plate 23' which lies beneath the key shanks and contains, in line with the handle 21, a recess or longitudinal channel 23'', arranged so that it can be brought into registration with and engaged by such shanks upon depressing the corresponding keys, whereby the carriers are locked with type bar letters, corresponding to the key board letters depressed, in registration with the aperture 13 corresponding to the type bar to be operated.

The type bars 9, 9', as they come into line with the shield aperture 13 and are moved forward by the cams 18, are normal to rollers 30, 30', which are journaled in housings or lever bearings 31, 31', and serve as abutments for the bars in registration therewith. The rollers are made adjustable, to adjust the working positions of the bars, by providing the inner ends of the housings with the pivotal connections 32, 32', with the frame member 24 and the outer ends with the sleeve connections 33, 33', with the rods 34, 34', which latter are secured to the machine frame; the rods having thereon the nuts 35, 35', for holding the housings in the desired positions.

The typebars 8, 8', upon reaching their culminations, are engaged respectively by plungers 37, 37', which reciprocate in guides, as 38, on the frame; the plungers having jaws, as 39, which lie in the notches 12 of the disks 11 and are engaged by the notches 10 of the type bars as they revolve into their culminating positions. Links 40, 40', are connected by pintles 41, 41', with the plungers, and links or arms 42, 42', are connected by a rod 43 with the respective links 40, 40'; the parts 42, 42', having fixed thereto downwardly extending arms, as 43', therewith forming crank levers, which are mounted on a rod 44 carried by the frame. The toggle mechanism thus formed is operated, to reciprocate the plungers and the type-bars connected thereto, by levers 45, 45', connected by a hand bar 46 and fulcrumed on a rod 47 which is carried by the housings 48; the levers having shoes as 49 which make contact with rollers as 50 on the rod 43 so as to straighten the toggles and thrust in the type bars when the hand bar is depressed, and make contact with the arms 43' to break the toggle and withdraw the type bars when the hand bar is elevated. To automatically elevate the hand bar and withdraw the type bars, the levers 45, 45', are provided with the arms as 51 which are connected by coiled springs 52 with a rod 53 held by the frame.

The carriage for the work 15 comprises the slide 54 adapted to reciprocate on the guide bar 55, with which it is interlocked, and the holder 56 for engaging the work. The holder comprises the jaw 57, having thereon the shank 58 provided with a shoe 59, and the jaw 60, connected by the pin 61 with the shank 58 and clamped by the screw 62 to the jaw 57.

The shoe 59 is sleeved on a vertical guide 63, fixed to the slide 54, and on a bar 64 having a vertical movement within the guide, limited by a pin 65 which is fixed to the bar and disposed in the slot 66 of the guide. The shoe may be fixed at various elevations along the bar by means of a spring pressed angle bolt 67 movable in the shoe and engageable in holes 68 of the bar, whereby the plate 15 may be raised in order that successive lines may be impressed thereon.

A projection 69 on the bar 64 is engaged by a bar 70 which extends parallel to the bar 55, the bar 70 having the arms 70' which are fixed to a bar 71 fulcrumed in the bearings 72. An arm 73, fixed to the bar 71, is connected by a link 74 with a bar 75 which is carried by arms 76, 76', of the levers 45, 45'. Consequently when the hand bar 46 is in the elevated position the work is, by the intermediate mechanism, held in the elevated position so that impressions made thereon are visible, while when the hand bar is depressed the compound lever mechanism connecting it with the bar 64 has permitted the latter to drop so that the work is held stationary in its lower position, when it is impressed by the type.

The carriage slide 54 is engaged in adjustable relation with a rack bar 77, the slide having a spring pressed pin 78 which engages recesses 79 at the respective ends of the bar, whereby the work may be moved along the rack bar and held in position to receive an impression from either the capital or small type.

The carriage being fixed in the desired position upon the rack bar, the latter is operated by means of an escapement comprising the lever 80, journaled on the bracket arms 81 on the bar 82, the pawl 83 connected to the lever 80 by an arbor 84 permitting it to rock transversely to the movement of the lever, and the spring 85 connecting the lever and the pawl so that the tendency of the pawl is to move away from the lever.

An arm 80' of the lever 80 has connected therewith, by the arbor 86, a trigger 87 having a movement limited by the stop pins 88 on the arm, and acting upon the trigger to oscillate the lever is a pin 89' of an arm 89 which is set on the rock shaft 44 and is oscillated by the rod 43 of the toggle mechanism, which passes therethrough. Synchronously with the depression of the hand bar and the straightening of the toggles to impress the type upon the work, the arm 89 causes the scape lever 80 to be moved out of and the pawl 83 to be moved into engagement with the rack bar, upon which the latter is moved through a space (limited by the movement of the pawl 83 into contact with the lever 81) through the action of the usual strap 90 connecting the rack bar and the spring mechanism 91. Upon the automatic rise of the hand bar and the breaking of the toggles, the arm 89 falls and the lever 80 is carried into the rack bar notch occupied by the pawl 83, while the latter drops down clear of the rack bar and springs out to position to engage, when again elevated, a further notch of the rack bar. The escapement can also be operated independently by means of the angular hand lever 92 adapted to rock in the bearings 93. The lever end 92' passes through a slot 94' of a controlling post 94 into contact with the lever 80 which is tilted by depressing the handle, the latter being elevated normally by a spring 93' (see Fig. 2).

The bar 82, which carries the main escapement for feeding the rack bar, is movable longitudinally against the action of the tension mechanism 91 by means of the longitudinally movable bar 95 having the inclined or wedging surface 95' engaging the shoulder 82'. The bar 95 is supported by a bracket 96 and guided by a bolt 97 which passes through the bar's slot 95ª. A rack 95ᵇ on the bar 95 is acted upon by escapement dogs 98, 98', having the pivotal connection 99 with an arm 100, the dogs being pressed against the rack by the springs 101 and 101'. A spring pressed brake 98ª engages the rack 95ᵇ and holds the bar 95 against displacement.

The arm 100 is fixed to the vertical shaft 102 which is journaled in bearings 103, 103'. Fixed to the shaft 102 is the lever 104 having arms 104' sleeved on pins 105 which are held by brackets 106, the arms having limited movements on the pins so that the lever can oscillate and the lever being brought to its central position by springs 108 placed on the pins between their pintles 109 and the arms.

Fixed to the rear ends of the shafts 3, 3', are the radially slotted disks 110, 110', and the longitudinally slotted spokes 111, 111'. The spokes 111, 111', have fulcrumed in the slots thereof, by means of pins as 112, cam fingers 113, 113', which are provided with holes as 114 through which are passed to limit their movement pins 115 fixed to the spokes. Springs 116, fixed to the pins 115 and to heels 117 on the cam fingers, hold the latter normally in the position shown in Fig. 2. The cam fingers are revolved, by the revolution of the respective shafts 3, 3', into juxtaposition with the ends of the lever 104 and the rollers 118, 118' of fingers 119, 119'; the latter being carried on the respective arms 76, 76' by pivots 120 and adjusting set screws 121.

When the revolution of the shafts 3, 3', has revolved characters requiring wide spaces, as the letters M and W, into operative position, a cam finger 113 has been revolved between a roller 118 and the corresponding end of the lever 104. Upon depressing the hand bar, the arms 76, 76', engage in slots of the disks 110, 110', so that the mechanism is locked in the exact position desired, the roller 118 acts through the registering cam finger 113 to rock the lever 104 and draw back the arm 100, the dog 98 engages the rack 95ᵇ and draws the bar 95, and the bar 82 is permitted to move the necessary distance under the action of the tension mechanism 91 to increase the space through which the main escapement moves the work 15 in positioning it for its impression. When the revolution of the shafts 3, 3', has revolved the characters requiring narrow spaces, as the letters l and i, into operative position, a cam finger 113' has been revolved between a roller 118' and the corresponding end of the lever 104. Upon depressing the hand bar the mechanism will be locked as before and the roller 118' will act through the cam finger 113' to rock the lever 104 and the arm 100 so that the dog 98' will engage the rack 95ᵇ and the bar 95 will be moved forward to draw the bar 82 and the main escapement mechanism carried thereby so that the normal effect of the operation of the escapement in moving the work to receive its impression has been reduced, whereby the letter occupies a space proportionate to its width.

Having described my invention, I claim:

1. The combination of a revoluble character carrier, character bearing keys, mechanism for revolving said carrier whereby characters are brought into operative position, said mechanism having a rectilineally reciprocating device with which shanks of said keys directly engage to hold said carrier, and mechanism whereby said characters are impressed upon material therefor.

2. The combination of a character device, means for reciprocating said device, a work holder, means for giving to said work holder a step by step movement horizontally across the path of reciprocation of said device, means for giving to said work holder a vertical motion of reciprocation across the path of reciprocation of said device and additional means for moving said work holder vertically for line spacing.

3. The combination of a revoluble shaft, a pair of carriers fixed on said shaft, mechanism for revolving said shaft, a set of character bearing keys having means for holding said mechanism, character bars adapted to reciprocate in each of said carriers, means for supporting the bars of one of said carriers against endwise movement, means for moving the bars of the other of said carriers in the line of the bars thus supported and means for automatically feeding thereto the material to be operated upon by said character bars.

4. The combination of a revoluble shaft, a carrier revoluble thereby, characters carried by said carrier, mechanism comprising a rectilineally reciprocating device for revolving said shaft, a set of keys having characters corresponding to the characters of said carrier, the respective keys having means adapted for engaging said device when the corresponding characters of said carrier are in operative position, and mechanism whereby material is impressed with the characters of said carrier.

5. The combination of a revoluble shaft, a carrier fixed thereon, a set of character bars carried by said carrier, means for reciprocating said bars, a pinion fixed on said shaft, a manually operated reciprocating rack engaging said pinion whereby said carrier is revolved to position said bars and means comprising a set of reciprocating keys for holding said rack.

6. The combination of a movable character carrier, means for moving said carrier, a work holder, means whereby said holder moves work step by step to position for receiving the impressions of said character devices, and means comprising a movable device having an inclined surface for automatically varying said steps.

7. The combination of a work holder, with a way therefor, means for giving a step by step movement to said work holder, and means comprising a longitudinally movable bar having an inclined surface for automatically varying the length of said steps.

8. The combination of a set of character devices, means for reciprocating said devices, a work holder, a way for said holder, means for giving a step by step movement to said work holder, and means operated by said first named means for automatically varying the length of one or more of said steps.

9. The combination of a set of character devices, means for reciprocating said devices, a work holder, transverse ways whereby said work holder is adapted to move in directions transverse to each other and to the reciprocations of said devices, and means for causing said work holder to move along said ways alternately with the reciprocations of said devices.

10. The combination of a revoluble carrier, a set of character bars adapted to reciprocate in said carrier, a work holder, transversely extending ways for said holder whereby work held therein can be moved in transverse directions across the path of reciprocation of said bars, means for giving said holder a continuous step by step movement along one of said ways, means for giving said holder a reciprocating movement along the other of said ways and additional means for moving said work holder for line spacing.

11. The combination of a revoluble carrier, a set of character bars revoluble thereby and adapted to reciprocate therein, a stationary circular device whereby said bars are engaged and held retracted during their revolution, means for locking said carrier with a desired character bar held in the place of culmination, and means for engaging and reciprocating said bar.

12. The combination of a pair of carriers, means for revolving said carriers together, a set of characters revolved by each carrier, means for reciprocating the characters of one carrier in line with the characters of the other carrier, a work holder, means for giving a continuous step by step motion to said work holder, connected with and operated by said means for reciprocating characters, mechanism for varying the length of one or more of said steps, and means for reciprocating said work holder.

13. The combination of a revoluble shaft, a pinion on said shaft, a rack bar engaging said pinion, a set of keys, means whereby said keys hold said bar, a pair of carriers revolved by said shaft, means revolved by said carriers for forming raised characters on sheet material, a holder for such sheet material, and means for giving a continuous step by step movement to said holder.

14. The combination of several revoluble parallel shafts, means having character bars revoluble by the respective shafts and adapted to reciprocate substantially parallel thereto, a holder for carrying work into position to be operated upon by said character bearing means, and mechanism whereby said character bearing means and work are brought into contact.

15. The combination of several revoluble shafts, a pinion on each of said shafts, a rack bar engaging said pinions, a set of character bearing keys, means whereby said keys hold said rack bar, a pair of character bearing carriers revoluble by each shaft, the characters of said carriers being in operative positions when keys bearing like characters hold said bar, a lever, and means whereby said lever causes the characters of the respective carriers to be imprinted upon a suitable substance.

16. The combination of a revoluble shaft, a carrier revoluble thereby, characters carried by said carrier, an oscillating lever, means operated by said lever for reciprocating said characters, means fixed on said shaft having slots corresponding to said characters, and means operated by said lever for engaging said slots and holding said characters in position.

17. The combination of a revoluble shaft, a carrier fixed thereon, character bars adapted to reciprocate in said carrier, a reciprocating device with which said bars are adapted to engage, an oscillating crank lever, a link connecting an arm of said crank lever with said device, and an oscillating lever having an arm which engages the arms of said crank lever to oscillate it.

18. The combination of a revoluble shaft, a carrier revolved thereby, characters carried by said carrier, a holder for material to be operated upon by characters positioned by said carrier, means comprising an escapement for giving a step by step movement to said holder, and mechanism for varying the location of said steps, said mechanism comprising a movable device for carrying said escapement, a rack bar having an inclined surface for engaging said device, a pawl for engaging and moving said bar, mechanism for operating said pawl, and means controlled by said shaft for acting upon said mechanism last named.

19. The combination of a revoluble shaft, one or more devices revolved thereby, an oscillating member with which said device is or devices are adapted to engage, an oscillating lever having means for moving said device or devices and causing the latter to move said member, an arm, means whereby said arm is connected with and operated by said member, a bar having an inclined surface, means whereby said arm moves said bar, a reciprocating member with which the inclined surface of said bar engages, an escapement carried by said member, a rack bar operated by said escapement, and means comprising a work holder carried by said rack bar.

20. The combination of a revoluble shaft, devices movably connected with and revolved by said shaft, an oscillating lever having means with which said devices are brought into registration and by which said devices are moved, an oscillating arm into position for engaging which said devices are adapted to revolve, a second arm connected with and oscillated by said arm first named, a reciprocating bar having an inclined surface, means whereby said second named arm engages and operates said bar, an escapement, carrying said escapement a reciprocating member movable by said inclined surface, a rack bar movable by said escapement, carried by said rack bar a holder for carrying material to be operated upon, characters revolved by said shaft, and means operated by said lever for impressing said characters on said material.

21. The combination of revoluble shafts, one or more oscillating cams revolved by each of said shafts, arms into position for engagement with which the respective shafts revolve said cams, a rock shaft with which said arms are connected, a rocking arm connected with said shaft, pawls carried by said rocking arm, a rack bar adapted to be engaged and moved in opposite directions by the respective pawls, means comprising an escapement engaged and moved by said bar, a rack bar engaged and moved by said escapement, and a work holder carried by said bar last named.

In witness whereof I have hereunto set my name this 23rd day of September, A. D. 1908, in the presence of the subscribing witnesses.

CHARLES B. STILWELL.

Witnesses:
 ROBERT JAMES EARLEY,
 JOS. G. DENNY, Jr.